United States Patent [19]
Hunn et al.
[11] 3,780,269
[45] Dec. 18, 1973

[54] DATA READING SYSTEMS

[75] Inventors: Bernard A. Hunn, Berkhamstead; Christopher Humphreys, Luton, both of England

[73] Assignee: Revenue Systems Limited, Harpenden, England

[22] Filed: June 13, 1972

[21] Appl. No.: 262,196

[52] U.S. Cl. .................. 235/61.11 H, 235/61.12 N, 235/61.7 B, 336/200, 340/171
[51] Int. Cl. ....... G06k 7/08, H01f 5/00, H04q 5/12
[58] Field of Search ................ 340/174 JA, 174 PA, 340/174 PF, 174 M, 174.1 H, 258 C, 149 A, 340/171, 184, 185; 331/178; 179/100.2 A; 328/27, 78; 336/200; 235/61.11 H, 61.7 B

[56] References Cited

UNITED STATES PATENTS

| | | | |
|---|---|---|---|
| 3,671,721 | 6/1972 | Hunn et al. | 235/61.11 H |
| 3,593,319 | 7/1971 | Barber | 235/61.11 H |
| 3,598,968 | 8/1971 | Victor | 235/61.12 N |

*Primary Examiner*—Daryl W. Cook
*Attorney*—Berman, Davidson and Berman

[57] ABSTRACT

A reading system is described for use with cards bearing data constituted by the resonant frequencies of a number of spiral elements. The reading system includes a number of drive lines equal to the number of rows of spiral elements on the cards and a number of detector lines equal to the number of columns of spiral elements on the cards. The drive lines and the detector lines are arranged at right angles to each other so that there is minimum coupling between them. Varying frequencies are applied to the drive lines and, when a spiral element resonant at the frequency applied to a drive line is located at the intersection of that drive line and one of the detector lines, a signal will be induced in the drive line and can be used to control reading apparatus.

13 Claims, 5 Drawing Figures

Fig. 1.

DATA READING SYSTEMS

This invention relates to data reading systems and in particular to systems for reading out data from cards.

The term "card" is used herein to denote any convenient form of token or the like which may be carried and inserted in a writing or reading machine. Such cards may be used, for example, as requisitioning elements for cash or goods-dispensing machines, or for any other purpose for which reliable and accurate identification of the card is essential.

Systems are described and claimed in United Kingdom Pat. Specification No. 1,233,260 in which the data to be read is represented by the resonant frequencies of a plurality of passive resonant devices arranged in, or on, a card. In such a system, the resonant frequencies and location of the resonant devices represent the data stored in the card and this data may be read from the card, for example, by placing the card with the resonant devices in the field of a reactive element fed with variable frequency oscillations. In such a system the presence of a resonant device in the field of the reactive element will affect the operation of the system in such a way that a signal is produced when the frequency of the oscillations is substantially equal to the resonant frequency of one of the resonant devices.

It would be possible to read out the information from a card using a single reactive element by moving the card relatively to the reactive element so that the various resonant devices were introduced in succession into the field. However, such a system would normally be inconvenient and it is preferred that a number of reactive elements should be provided so that all the data on the card can be read out without the necessity for relative movement between the card and the reactive element.

When a number of reactive elements are provided, it is necessary that the selected frequencies should be supplied to them in succession and, in particular, the elements may be in the form of elongated loops to which the oscillations are fed through switches. Such an arrangement has a number of disadvantages, particularly when the frequency of the oscillations is relatively high, for example, in the range 200–500 MHz. At such frequencies there is relatively little difference between the impedance of an open and a closed switch and other effects combine to make it difficult to distinguish accurately between the presence and absence of a device resonant at a particular frequency.

It is an object of the invention to provide a data reading system which does not suffer from the above-mentioned disadvantages.

The invention consists in a data reading system in which at least some of the data to be read is represented by the resonant frequencies of a plurality of passive resonant devices arranged in a line in, or on, a card and in which, when the data is to be read from said line, the card is placed with the resonant devices in said line in the field of a primary longitudinally extending inductive element, fed with variable frequency oscillations, each of said devices also being in the field of a respective one of a plurality of secondary inductive elements arranged so that the energy transfer from the primary element to any secondary element is greater when the frequency of said oscillations is substantially equal to the resonant frequency of the device in the field of that secondary element than when the frequency of said oscillations differs from said resonant frequency.

Preferably, the resonant devices are arranged on the card in a plurality of parallel lines and, when the data is to be read, the card is placed with the resonant devices in each of said lines in the field of a respective one of a plurality of primary longitudinally extending inductive elements.

Preferably, the mutual inductance between the, or each, primary element and each of the secondary elements is substantially zero. The required very low mutual inductance may be obtained, for example, by arranging the longitudinal axes of the secondary elements so that they are perpendicular to the longitudinal axis of the, or each, primary element.

Preferably, each of said inductive elements is in the form of a radio-frequency line which may be produced as a strip of copper on a printed circuit board.

It is to be understood that the spacing between the secondary inductive elements will be such that the site of a resonant device on the card will correspond to the intersection between the primary element and a respective one of the secondary elements. If oscillations of a particular frequency are fed to the primary element and a device resonant at that frequency is located at the intersection of the primary element with one of the secondary elements, there will be coupling between the primary element and that secondary element. Accordingly, a signal may be produced, for example, by connecting a detector to the secondary element. If resonant devices are located at all the intersections between the primary element and the respective secondary elements and if a detector is provided for each secondary element, a signal will be produced by each detector when the frequency of the oscillations fed to the primary element is substantially equal to the resonant frequency of the resonant device located at the intersection between the primary element and the secondary element to which that detector is connected.

The passive resonant devices may be, for example, in the form of rectangular open-ended spirals, two opposite sides of each rectangle being parallel to the longitudinal axis of the primary element and the other two opposite sides of each rectangle being parallel to the longitudinal axes of the secondary elements when the card is in position.

Best results are obtained in a system in accordance with the invention when the mutual inductance between the primary inductive element and each resonant device is small, while the mutual inductance between each secondary inductive element and the respective resonant device is large. Accordingly, it is desirable that the card carrying the resonant devices should be nearer to the secondary inductive elements than to the primary inductive elements during the reading process. Thus, for example, the secondary elements may all lie above the primary element or elements and the card to be read may be located above the secondary elements.

In one particular arrangement in accordance with the invention, a separate detector is provided for each secondary element, and switching means are used to render the various detectors operative in succession. In this arrangement, a plurality of primary elements are used and, again, switching means are provided to connect these elements in turn to a variable frequency oscillator. Control logic is also provided to select the primary elements, the detectors and the oscillator frequency in a fixed sequence. This sequence may involve, for example, applying a particular frequency initially to the first primary element and thereafter activating all the detectors in succession. Thereafter, a second frequency is applied to the first primary element and, again, all the detectors are activated in succession. When all the frequencies have been applied to the first primary element, the cycle is repeated for the second primary element.

In an alternative arrangement, the first frequency is applied to the primary elements in succession while the first detector is activated. Thereafter, the second frequency is applied to the primary elements in succession, again with the first detector activated. When all the frequencies have been used, this sequence is repeated for the remaining detectors. Whatever switching sequence is used, the detectors serve to produce a serial message at a clock rate equal to the switching rate. This message can be interpreted as a binary-coded decimal serial word of length equal to the number of different combinations.

One method of performing the invention will now be described with reference to the accompanying diagrammatic drawings, in which.

Figure 1:
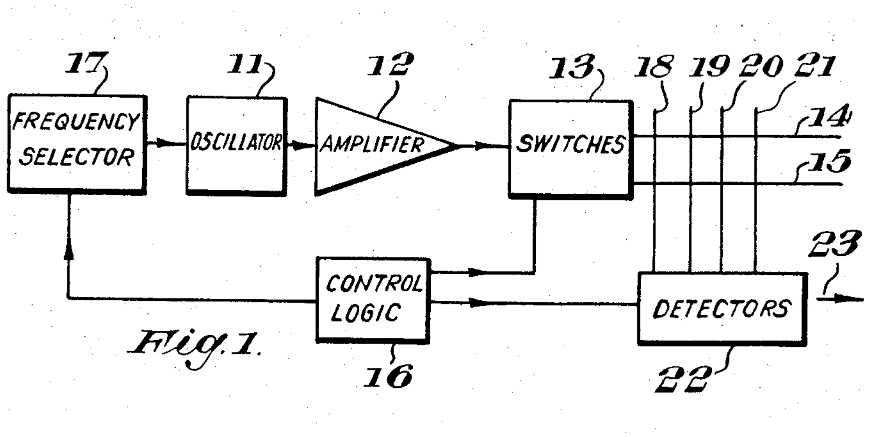
FIG. 1 is a block diagram of a system in accordance with the invention.

The system illustrated in FIG. 1 includes a variable frequency oscillator 11, the output of which is passed through a buffer amplifier 12 and switches 13 to a pair of drive lines 14 and 15. The switches 13 are controlled by control logic 16 and serve to connect the output of the amplifier alternately to the drive line 14 or the drive line 15. The control logic 16 also controls a frequency selector 17 which, in turn, controls the oscillator 11. The oscillator 11 is a voltage-controlled oscillator and may be, for example, an oscillator as described and claimed in Specification No. (U.S. Pat. application No. 7968/71). In the particular arrangement being described, the output of the frequency selector 17 may have any one of four nominal values, each of which causes the oscillator to operate at a respective one of four frequencies. These frequencies may be, for example, in the band 200 to 500 MHz and will be referred to hereinafter as $f1, f2, f3$ and $f4$. In addition, if desired, the frequency selector 17 may include a ramp generator which causes the voltage output of the frequency selector to vary on either side of each of its nominal values. This, in turn, causes the frequency of the oscillator to be swept about a centre frequency in each case. The purpose of this is to take up any tolerances due to variation of the positions of the resonant devices on the card being read since such variation can alter the coupling between a resonant device and a drive line and give a slightly different resonant frequency.

In addition to the drive lines 14 and 15, the read matrix includes ten detector lines, four of which are indicated at 18, 19, 20 and 21. These detector lines are connected to detectors 22 which are rendered operative in turn by the control logic 16 and feed a common output terminal 23.

The arrangement is such that there is normally no coupling between either drive line and any of the detector lines but, if a device resonant at the frequency applied to a drive line is present at the intersection between that drive line and one of the detector lines, an output will be applied to the terminal 23 when the detector connected to that detector line is rendered operative by the control logic.

Figure 2:
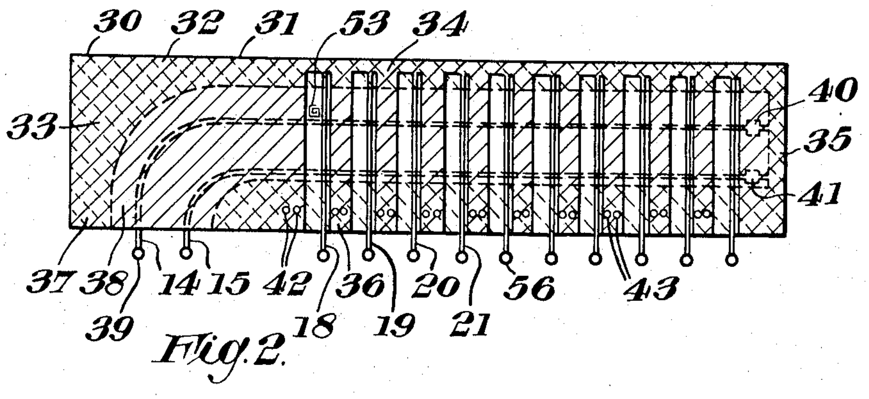
FIG. 2 is a plan view of the read matrix of the system illustrated in FIG. 1.

One possible form of the read matrix is illustrated in FIG. 2 and consists of a rectangular glass-epoxy printed circuit board 30 having copper areas on both sides. The copper areas on the upper surface in the drawing are indicated by full diagonal lines such as 31, sloping downwardly in the drawing from right to left. Copper areas on the underside of the matrix illustrated in the drawing are indicated by broken diagonal lines such as 32 extending downwardly from left to right in the drawing. Thus, the upper side of the board includes a large solid copper area on the left-hand side illustrated at 35. In addition, the upper surface also includes peripheral areas 34 and 35 and nine screening strips such as 36 parallel with the shorter edges of the board and extending from the peripheral area 34. Finally, the upper surface includes ten detector lines such as those illustrated at 18, 19, 20 and 21. Each of these detector lines is connected at one end to a terminal such as that indicated at 56 and at the other end to the peripheral area 34.

The lower surface of the card 30 includes a peripheral copper area 37 enclosing an area 38. Copper is etched away from the area 38 to leave the two drive lines 14 and 15. Each of the drive lines is connected at one end to a terminal such as that indicated at 39 and is connected at the other end through respective resistance-capacitance networks 40 and 41 to the peripheral area 35.

The copper area 33 at the left-hand side of the upper surface of the card is connected to earth and to the peripheral area 37 on the lower surface of the card by means of rivets 42 and each of the stirps 36 is connected to the peripheral area 37 by a pair of rivets such as those indicated at 43.

Figure 3:
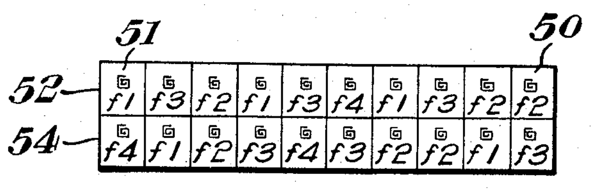
FIG. 3 is a plan view of a card for use with the system illustrated in FIGS. 1 and 2.

A card suitable for use with the matrix illustrated in FIG. 2 is illustrated in FIG. 3, and it will be seen that the card 50 includes 20 passive resonant devices such as that illustrated at 51, each in the form of a rectangular spiral of copper. The information carried by the card is written into the card by adjusting the resonant frequencies of the twenty spirals. The card may be generally of the form described in U.S. Pat. Specification No. 1,233,260 and the spirals may be tuned to the required frequencies by the method described in U.S. Pat. Specification (application No. 9498/71).

It will be seen that the arrangement of the spirals 51 on the card 50 is such that, if the card is placed over the read matrix illustrated in FIG. 2 with the left-hand spiral on the upper row 52 located at the intersection of the drive line 14 and the detector line 18, each of the remaining spirals will be located at the intersection of one or other of the drive lines and a respective one of the detector lines. For convenience, the location of the left-hand spiral referred to is indicated in FIG. 2 at 53. It will be seen that one pair of sides of the rectangular spiral is parallel to the drive line 14 while the other pair of sides is parallel to the detector line 18. Accordingly, there is coupling between the drive line 14 and the spiral and also coupling between the spiral and the detector line 18. If the card is located on the upper surface of the matrix 30, the mutual inductance between the spiral and the detector line will be greater than the mutual inductance between the drive line and the spiral and this arrangement has been found to give best results.

As already stated, the energy transfer from either drive line to any of the detector lines is normally very low since the two lines are perpendicular to each other. However, if a spiral resonant at the frequency applied to a drive line is located at the intersection between that drive line and one of the detector lines, there will be a relatively large energy transfer to that detector line. At frequencies other than the resonant frequency of the spiral, the energy transfer will still be relatively low.

There are many possible ways of entering information in the card based on the resonant frequencies of the spirals, and the control logic 16 (FIG. 1) will be arranged to suit the particular system used. The drive lines, the detectors and the oscillator are switched by the control logic in a predetermined sequence which might consist, for example, in applying the frequency *f1* initially to the drive line 14 and activating the 10 detectors in succession in order to locate any spirals resonant at the frequency *f1* in the row 52. Thereafter, the frequencies *f2*, *f3* and *f4* could be applied in succession to drive line 14 in order to locate any spirals resonant at these frequencies in the row 52. Thereafter, the amplifier 12 could be switched to the drive line 15 and the process repeated to detect the resonant frequencies of the spirals in the lower row 54. The resulting signals appearing on the output 23 could then be applied to a suitable decode in order to display or store the information obtained from the card.

In an alternative encoding system, the pairs of spirals in each column of the card are utilised to represent a single four-digit binary number. Each of these four-digit binary numbers can, in turn, if desired, represent a decimal digit or a letter of the alphabet. The frequency of the spiral in the row 52 can, in each case, represent the two most significant digits of the binary number and the spiral in the row 54 can represent the two least significant digits of the binary number. In the case being considered in which there are four possible resonant frequencies to which the spirals can be tuned, the coding system can be as follows: *f1* = 00 *f2* = 01 *f3* = 10 *f4* = 11

This coding system will give $4^2 = 16$ possible different binary numbers for each pair of spirals, said numbers ranging from 0000 to 1111, and, if desired, the binary numbers 0000 to 1001 can represent the decimal digits 0 to 9 in the normal way and the binary numbers 1010 to 1111 can be used, for example, to represent the first six letters of the alphabet. Thus, the complete coding system in this case would be as follows:

| | |
|---|---|
| f1 f1 = 0000 = 0 | f3 f1 = 1000 = 8 |
| f1 f2 = 0001 = 1 | f3 f2 = 1001 = 9 |
| f1 f3 = 0010 = 2 | f3 f3 = 1010 = A |
| f1 f4 = 0011 = 3 | f3 f4 = 1011 = B |
| f2 f1 = 0100 = 4 | f4 f1 = 1100 = C |
| f2 f2 = 0101 = 5 | f4 f2 = 1101 = D |
| f2 f3 = 0110 = 6 | f4 f3 = 1110 = E |
| f2 f4 = 0111 = 7 | f4 f4 = 1111 = F |

Particular examples are shown in FIG. 3 and it will be seen that the information contained in this particular card is 3852BE1946. It will be understood that, with the particular coding system described, it is necessary for the control logic to operate in such a way that all four frequencies are initially applied to the drive line 14 while the detector line 18 is operative and for all four frequencies thereafter to be applied to the drive line 15 still with the detector line 18 operative. This process is then repeated for the detector lines 19, 20, 21 and so on. Thus, assuming that the four frequencies are applied in the order *f1*, *f2*, *f3* and *f4*, it will be understood that the outputs obtained at 23 for spirals of the four frequencies will be as follows:

*f1* = 1000
*f2* = 0100
*f3* = 0010
*f4* = 0001

This output is, therefore, connected to a converter which preforms the following conversions:

1000 to 00
0100 to 01
0010 to 10
0001 to 11

Figure 4:
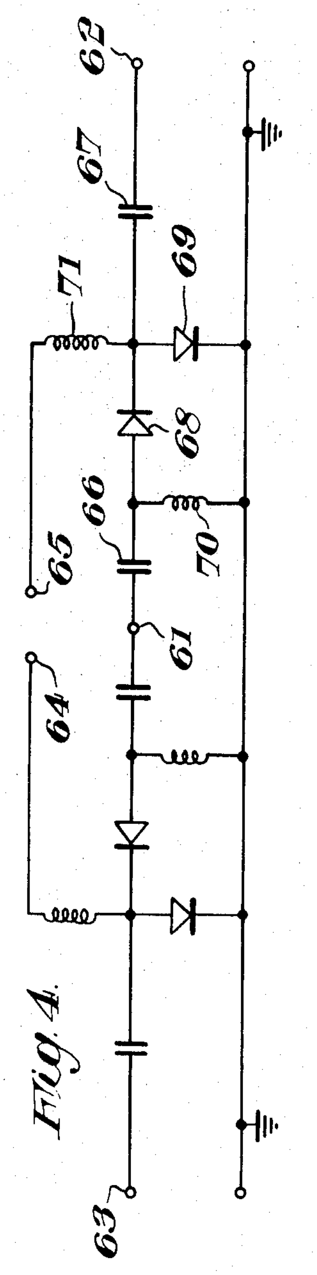
FIG. 4 is a circuit diagram of the switches 13 of FIG. 1.

FIG. 4 is a simplified circuit diagram of the switches 13 (FIG. 1).

The output of the amplifier 12 is applied between earth and input terminal 61 and the drive lines 14 and 15 are connected respectively to output terminals 62 and 63. The control inputs from the control logic 16 are applied to two control terminals 64 and 65. In the case of the switch between the terminal 61 and the terminal 62, the components concerned consist of capacitors 66 and 67, diodes 68 and 69, and inductors 70 and 71. The components between the input terminal 61 and the output terminal 63 are similar and need not be described in detail. If it is assumed that the control voltage applied to the control terminal 65 is positive with respect to earth, the diode 68 is reverse biased and the diode 69 is forward biased. Therefore, the diode 68 presents a high impedance and isolates the input terminal 61 from the output terminal 62. The diode 69, on the other hand, has a low impedance and effectively shorts the output terminal 62 to earth for alternating current. Thus, so far as the output terminal 62 is concerned, the switch is in the open position. If the control voltage applied to the terminal 65 is negative with respect to earth, the diode 68 is forward biased and the diode 69 is reverse biased. As a result, the short circuit between the terminal 62 and earth is removed and instead the terminal 62 is connected for alternating current to the terminal 61. Thus, the switch is in the closed position.

Figure 5:
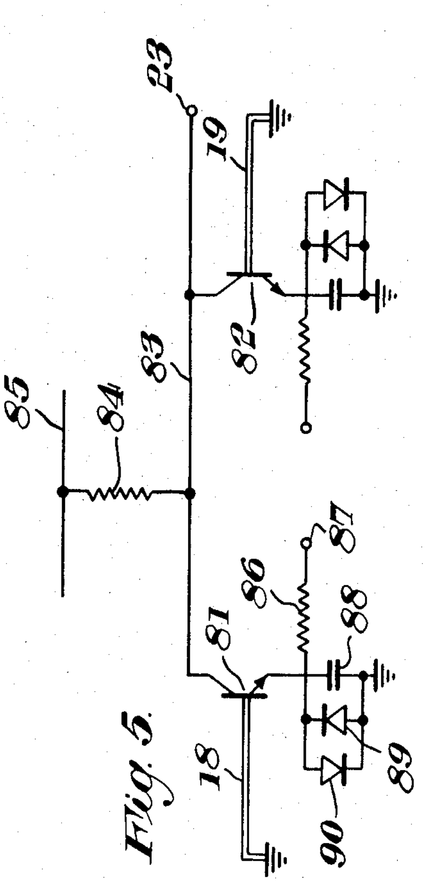
FIG. 5 is a circuit diagram of two of the detectors 22 of FIG. 1.

FIG. 5 is a simplified circuit diagram of two of the detectors 22 (FIG. 1). These detectors include transistors 81 and 82, to the base electrodes of which are connected respectively two of the detector lines 18 and 19. It is to be understood that similar detectors are provided for the remaining eight detector lines. The collectors of all the transistors are connected to a common rail 83 leading to the output terminal 23. This common rail is connected through a common load resistor 84 to a positive supply line 85. The emitter of each transistor is connected through a respective resistor to a control terminal. In the case of the transistor 81, this resistor is indicated at 86 and the control terminal is indicated at 87. A large de-coupling capacitor 88 is connected between the emitter and earth and two oppositely directed diodes 89 and 90 are connected in parallel with this capacitor.

If the terminal 87 is positive with respect to earth, the transistor 81 will be non-conductive and the diode 90 will be conductive. This diode protects the transistor from damage due to the reverse bias on the emitter-base junction. If, on the other hand, the terminal 87 is negative with respect to earth, the diode 89 will become conductive and the transistor will be just conducting. When a signal is induced in the detector line 18, the positive half cycles thereof will be amplified while the negative half cycles will render the transistor non-conductive. Thus, if a radio-frequency signal is present in the detector line 18, the collector voltage will fall and thus change the potential of the terminal 23. It is to be understood that this drop in potential will be interpreted as a binary 1 whereas the normal potential of the terminal 23 when no radio-frequency signals are present is interpreted as a binary 0. Each of the detectors illustrated in FIG. 5 operates as a Class B amplifier providing simultaneous detection and amplification, and thus makes it possible to detect a radio-frequency signal on the respective detector line even if it has a relatively low level.

What is claimed is:

1. A data storage and readout system comprising, a card having a plurality of passive resonant devices, each having a predetermined resonant frequency representing particular data stored, arranged in at least one line, a read matrix having at least one primary longitudinally extending inductive element and a plurality of secondary inductive elements, said card being placeable adjacent the read matrix with the resonant devices in said line positioned in the field of said primary inductive element and each of said resonant devices being positioned in the field of a respective one of said secondary inductive elements when the data stored in the card is to be read, means for feeding variable frequency oscillations to the primary inductive element, the arrangement of said passive resonant devices on the card and of said primary and secondary inductive elements on the read matrix being such that the energy transfer from the primary element to any secondary element is greater when the frequency of said oscillations is substantially equal to the resonant frequency of the device in the field of that secondary element than when the frequency of said oscillations differs from said resonant frequency, whereby data may be read from the card by detection of energy transfer to the said secondary elements.

2. A system as claimed in claim 1, in which said passive resonant devices are arranged in a plurality of parallel lines on said card, there being a plurality of longitudinally extending elements on the read matrix, and wherein the resonant devices in each of said lines is positioned in the field of a respective one of the plurality of primary inductive elements in the read matrix when the card is being read.

3. A system as claimed in claim 1, in which each of the passive resonant devices is in the form of a rectangular, open-ended spiral.

4. A system as claimed in claim 1, wherein the mutual inductance between each said primary element and each said secondary element is substantially zero.

5. A system as claimed in claim 4, in which the longitudinal axes of the secondary elements are prependicular to the longitudinal axis of each primary element.

6. A system as claimed in claim 5, in which each of said primary and secondary inductive elements is in the form of a radio-frequency line.

7. A system as claimed in claim 6, in which each of said radio-frequency lines is a strip of copper on a printed circuit board, said lines and said board together constituting said read matrix.

8. A system as claimed in claim 7, in which, when the card is in position to be read, the mutual inductance between each primary inductive element and each resonant device in its field is smaller than the mutual inductance between each secondary inductive element and the respective resonant device in its field.

9. A system as claimed in claim 8, in which the primary inductive elements are located on one side of the board and the secondary inductive elements are located on the other side of the board.

10. A system as claimed in claim 1, further including a plurality of drive strips constituting said primary inductive elements and a plurality of detector strips constituting said secondary inductive elements, said means for feeding variable frequency oscillations being a variable frequency oscillator, and switching means for selectively connecting the output of the oscillator to said drive strips.

11. A system as claimed in claim 10, including a plurality of detectors, one for each detector strip, and a switching means for selectively rendering said detector operative to detect signals in the respective detector strips.

12. A system as claimed in claim 11, in which each detector includes a transistor, the base electrode of which is connected to the corresponding detector strip and the collector of which is connected to a first supply line through a resistor common to all the detectors, in which an output terminal is connected to all the collectors in common, and in which switching signals are applied through respective resistors to the emitters of all the transistors to render them operative in succession.

13. A system as claimed in claim 10, including means for setting the variable frequency oscillator to a plurality of nominal frequencies and further means for causing the oscillator frequency to fluctuate on either side of each of said nominal frequencies.

* * * * *